US010936383B2

(12) United States Patent
Vaswani

(10) Patent No.: US 10,936,383 B2
(45) Date of Patent: Mar. 2, 2021

(54) HARD CODED CREDENTIAL BYPASSING

(71) Applicant: Micro Focus Software Inc., Wilmington, DE (US)

(72) Inventor: Gulshan Govind Vaswani, Bangalore (IN)

(73) Assignee: Micro Focus Software Inc., Wilmington, DE (US)

( * ) Notice: Subject to any disclaimer, the term of this patent is extended or adjusted under 35 U.S.C. 154(b) by 189 days.

(21) Appl. No.: 15/604,154

(22) Filed: May 24, 2017

(65) Prior Publication Data

US 2018/0343239 A1    Nov. 29, 2018

(51) Int. Cl.
  *G06F 9/54*      (2006.01)
  *H04W 12/06*     (2021.01)
  *H04L 29/06*     (2006.01)

(52) U.S. Cl.
  CPC .......... *G06F 9/543* (2013.01); *H04L 63/0815* (2013.01); *H04W 12/0608* (2019.01)

(58) Field of Classification Search
  CPC ........ H04L 63/062; H04L 63/08; G06F 9/543
  See application file for complete search history.

(56) References Cited

U.S. PATENT DOCUMENTS

| 9,781,096 | B2 * | 10/2017 | Sade ....................... G06F 21/42 |
| 2008/0196101 | A1 * | 8/2008 | Sade ....................... G06F 21/33 726/22 |
| 2009/0178061 | A1 * | 7/2009 | Sandoval .................. G06F 9/54 719/328 |
| 2013/0054433 | A1 * | 2/2013 | Giard ...................... H04L 67/22 705/34 |
| 2016/0080355 | A1 * | 3/2016 | Greenspan ............ G06F 21/577 726/7 |
| 2016/0308876 | A1 * | 10/2016 | Smith, III ............. H04L 63/102 |
| 2016/0357955 | A1 * | 12/2016 | Kruse ..................... G06F 21/45 |
| 2017/0272462 | A1 * | 9/2017 | Kraemer ............. H04L 63/1441 |
| 2017/0329985 | A1 * | 11/2017 | Barboy .................. G06F 21/44 |

* cited by examiner

*Primary Examiner* — Eleni A Shiferaw
*Assistant Examiner* — Bassam A Noaman
(74) *Attorney, Agent, or Firm* — Schwegman Lundberg & Woessner, P.A.

(57) ABSTRACT

An existing application processing on a client device initiates a function to provide a hard coded credential to a remote target application for purposes of logging into and gaining access to the remote target application. A hook to the function causes an agent to be activated, the agent dynamically contacts a credential vault to obtain a randomly generated credential for access to the remote target application. The hook injects the randomly generated credential over the hard coded credential supplied by the existing application and the function is initiated. The function logs into the target application using the randomly generated credential providing the existing application access to the remote target application. The hard coded credential is bypassed by the randomly generated credential.

19 Claims, 5 Drawing Sheets

HARD CODED CREDENTIAL BYPASSING

BACKGROUND

Network and computer security are of paramount concern in the industry today. It seems as if a week does not go by without some news about a network system being compromised. Moreover, this is not just private industry as governmental agencies experience security breaches with as much frequency as the private sector.

One particular area of concern for network-based processing is existing application software that needs to access a remote network service for part of its processing. This software is typically hard coded with an identifier (id) and password for accessing the remote network service. During normal execution, the application logs into the remote service using the hard coded id and password, such processing is common practice for many conventional win32-based applications. These applications are generally background processes that lack any Graphical User Interface (GUI) screens for manual user interaction and login, by the user, to the remote services.

These applications present significant network security concerns. For example, if a hacker gets access to one of these application's source code or if a hacker creates a memory dump during execution of an application's binary code, then the id and password for a remote service can be obtained. The account credentials for these remote services are generally not changed because such a change would necessitate changing the applications and recompiling these applications on the clients in which they are installed. In some instances, the source code for these applications may not even exists on the clients; rather, just the binaries are present.

Furthermore, some of these hard coded identifiers and passwords may even have administrative access rights in the remote services, such that when the identifiers and passwords are exposed to a hacker, the hacker can do even greater damage within the servers that process the remote services.

SUMMARY

Various embodiments of the invention provide methods and a system for hard coded credential bypassing. In an embodiment, a method for hard coded credential bypassing is presented.

Specifically, in an embodiment, an internal portion of processing for an existing application processing on a client is bypassed when an attempt is made by the existing application to process the internal portion. A randomly generated credential is obtained on behalf of the existing application. The randomly generated credential is injected into the internal portion of the processing for allowing the existing application to log into a target application with the randomly generated credential.

DETAILED DESCRIPTION

Figure 1A:
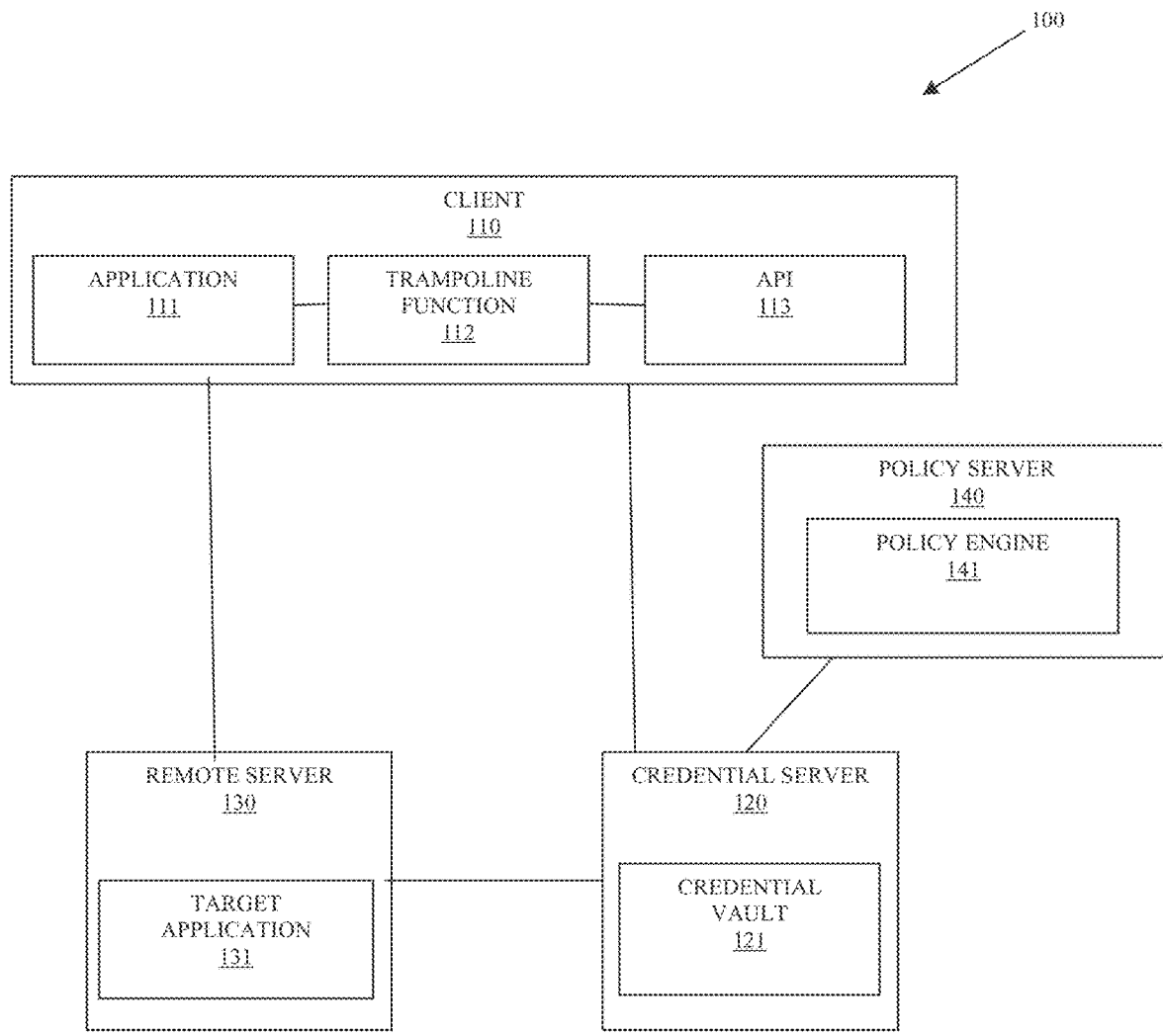
FIG. 1A is a diagram depicting a system for hard coded credential bypassing, according an example embodiment.

A "resource" includes: a user, service, an application, system (groupings of applications, services, and/or hardware devices/virtual devices), a hardware device, a virtual device, directory, data store, a set of devices logically associated with a single processing environment, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, Media Access Control (MAC) address, Internet Protocol (P) address, device serial number, etc.

A "credential" is a secret term, phrase, encrypted data, and/or key used for authenticating a principal to a resource (such as a processing environment). Authentication resolves to an identity for the principal, which is assigned access rights and/or access policies that are linked to that identity during interactions between the principal and the resource.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment. Moreover, a processing environment can be layered on top of a hardware set of resources (hardware processors, storage, memory, etc.) as a Virtual Machine (VM) or a virtual processing environment.

The phrases "processing environment," "cloud processing environment," "hardware processing environment," and the terms "cloud" and "VM" may be used interchangeably and synonymously herein.

Moreover, it is noted that a "cloud" refers to a logical and/or physical processing environment as discussed above.

A "service" as used herein is an application or software module that is implemented in a non-transitory computer-readable storage medium or in hardware memory as executable instructions that are executed by one or more hardware processors within one or more different processing environments. The executable instructions are programmed in memory when executed by the hardware processors. A "service" can also be a collection of cooperating subservices, such collection referred to as a "system."

A single service can execute as multiple different instances of a same service over a network.

Various embodiments of this invention can be implemented as enhancements within existing network architectures and network-enabled devices.

Also, any software presented herein is implemented in (and reside within) hardware machines, such as hardware processor(s) or hardware processor-enabled devices (having hardware processors). These machines are configured and programmed to specifically perform the processing of the methods and system presented herein. Moreover, the methods and system are implemented and reside within a non-transitory computer-readable storage media or memory as executable instructions that are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1B and 2-4.

FIG. 1A is a diagram depicting a system 100 for hard coded credential bypassing, according an example embodiment. It is noted that the system 100 is presented as an illustrated embodiment and that other component definitions are envisioned without departing from the embodiments discussed herein. It is also to be noted that only those components necessary for comprehending the embodiments are presented, such that more or less components may be used without departing from the teachings presented herein.

The system 100 includes: a client 110, a credential server 120, a remote (target) server 130, and, optionally, a policy server 140.

The client 110 includes an existing application 111 associated with accessing an existing target application 131 of the remote server 140. By "existing" it is meant that the applications 111 and 131 do not require any coding modifications for performing the various techniques discussed herein. Furthermore, the existing application 111 lacks any GUI-based interface and includes as part of its processing a hardcoded credential that is processed by the existing application 111 for accessing (authenticating and logging into) the target application 131. That is, the existing application 111 lacks any GUI-based interface that accepts credentials to login to the target application 131, since it is noted that the existing application 111 may include a GUI-based interface for other communications but lacks any GUI-based interface for providing credentials to log into the target application 131.

The client 110 also includes a trampoline function 112. The trampoline function 112 is a modification made in memory to an address of a specific internal function that processes within the application 111 to force an interrupt and a jumping to the API 113 when that specific function is attempted to be processed by the application 111. Once the API 113 processes the results from API are returned to the internal function of the application 111 for processing by the internal function. The internal function of the application 111 contacts the target application 131 with credentials (or id and credential pair) for purposes of the application 111 gaining authenticated access to the target application. None of this processing within the application 111 is changed, the change is injection of the trampoline function 112 that forces the processing of API 113 with a new input string returned as results and provided to the internal function of the application 111 for logging into and gaining access to the target application 131. So, when the application accesses a memory address to call its internal function from logging into the target application 131, the trampoline function 112 points the memory address to call the API 113; the API 113 processes in manners discussed herein and below and the return address from the API 113 on the processing stack immediately calls the memory address associated with the internal function with the results of the API 113 (the results representing dynamically acquired credentials for the application 111 to log into the target application 131).

In this way, no modifications or changes are made to the application 111 or its internal function on the client 110; there is no change made to any interfaces associated with the application 111 and the application 111 is completely unaware of and unmodified for the processing of the API 113, which is achieved through the trampoline function 112 in memory of the client 110 and during normal execution of the application 111 when the application 111 internally calls its internal function for logging into the target application 131.

The API 113 is configured upon invocation from the trampoline function 113 to perform a variety of processing for purposes of dynamically obtaining a valid set of credentials that will allow the application 111 (through its internal function) to successfully authenticate and log into target application 131 for a valid communication session between the application 111 and the target application 131.

The application 111 includes a hard coded credential that the application 111 passes to its internal function for purposes of logging into, authentication with, and gaining access to the target application 131. For purposes of the teachings presented herein, the hard coded credential is essentially ignored and the new dynamical credential acquired by the API 113 is passed to the internal function for authenticating the application 111 for access to the target application 131.

The API 113 is called through the trampoline function 112 by a pointer to the address of the API 113 when the address of the internal function is first processed by the application 111. Once the API 113 is done processing, the address of the internal function is processed normally; however, the data passed to the internal function is the result of the processing performed by the API 113, which is the new dynamically obtained credential for authenticating to the target application 131. The hard coded credential is bypassed and with the new credential by the API 113 and the next line of code in the internal function of the application 111 that follows acquiring the hard coded credential is processed with the new credential. So, the existing application 111 calls the internal function with the hard coded credential (password). This results in the trampoline function 112 being called. The trampoline function 112 interacts with the API 113 and agent (discussed below). The agent obtains a dynamic-provided credential from the credential vault 121 and returns control back to the trampoline function 112, which resumes processing the internal function at the point where the rest of the processing (after the point in which the hard coded credential was obtained by the internal function) of the internal function continues to automatically authenticate to the target application 131 with the dynamically-provided credential.

When invoked, the API 113 initiates an agent processing on the client. The agent dynamically obtains a valid credential on behalf of the application 111 and returns that credential for the application 111 to authenticate for access to the target application 131.

The agent can perform a variety of security processing. For example, the agent makes a request on behalf of the application 111 to a credential vault 121 to obtain a valid credential for the application 111. The agent can pass a variety of information about the application 111 for purposes of obtaining a valid credential, such as the application's process identifier, process name, a checksum value that the agent calculates on the executable of the application 111, a user identifier or identity for the user associated with the account under which the application 111 was executed within the processing environment of the client, a client name, a client Internet Protocol (IP) address, a client Media Access Control (MAC) address, a processing environment identity or processing environment identifier, current date, current time of day, and the like. In fact, the agent can be configured to pass a request for a new credential to the credential vault 121 with all or some combination of the above-identified information, which the agent can obtain from the Operating System (OS) where the application 111 is processing.

The credential vault 121 can maintain its own account for access to the target application 131 and use an API to establish and dynamically change its credential for access to the target application 131. In an embodiment, the account is an account held by the existing application 111 with the target application 131, such that the credential vault 121 processes the API of the target application 131 to pose as the existing application 111 (or administrator of that account) for purposes of changing and maintaining a current credential for the account of the existing application 111 with the target application 131.

In an embodiment, the credential vault 121 maintains multiple accounts with the target application 131 for multiple different existing applications 111 that can span multiple clients 110 for purposes of maintaining and continuously updating credentials for those multiple (independent managed) accounts with the target application 131.

In some embodiments, it may be that the credential vault 121 is an identity manager or authentication mechanism for the target application 131, such that the target application 131 uses the credential vault 121 for indicating whether a requesting application (such as application 111) and the provided credential are authorized for access to the target application 131. Here, the credential is still provided to the existing application 111 in the manners discussed above but when the existing application 111 presents the credential to the target application 131, the target application 131 uses an API to redirect the existing application to the credential vault 121 for authentication and relies on the credential vault 121 to indicate with an assertion that the existing application 111 is authorized for access to the target application 131. In other words, in this embodiment, the credential vault is the authenticator for the target application 131 but the credential still comes from the existing application 111 in the manners discussed above.

In an embodiment, when the agent makes a request on behalf of the application for a credential to access the target application 131. The credential vault 131 authorizes the request by providing the application processing parameters provided by the agent with the request to a policy engine 141. The policy engine 141 evaluates policy conditions based on the processing parameters and provides back to the credential vault 131 an indication as to whether the request is to be authorized or denied, and optionally, specific restrictions with respect to the request, such as a time-based limit for use, single access use, and other configured restrictions defined by the evaluation of the policy conditions.

Once the credential vault 121 authorizes the request, an existing credential is flagged as being checked out for use by the application 111 and the credential is provided to the agent. The agent provides the credential to the API 113, and the API 113 writes over the hard coded credential originally provided by the application 111 to the internal function with the credential and returns control to the processing stack, which then executes the internal function. The application 111 then processes as it normally would with the internal function calling the target application 131 for access with the credential (provided from the credential vault 121). The target application 131 authenticates the application 111 for access and performs whatever processing it needed or was designed to perform with the target application 131. The original hard coded credential is useless and will not be useful for accessing the target application 131 because it will be an invalid credential. So, if the application's code is hacked, the hard coded credential poses no security risk to the remote server 130 and the target application 131.

In an embodiment, the credential vault 121 randomly and dynamically generates the credential once the request from the agent on behalf of the application is authenticated as a valid request for accessing the target application 131.

In an embodiment, the credential vault 121 randomly generates the credential in advance of a first time request made by the agent, such that the randomly generated credential is ready for use by the application when it is requested.

In an embodiment, the credential vault 121 maintains a lock on the credential as being checked out once the credential is provided to the agent. When a restriction is reached for the credential (such as identified by the policy engine) or when the agent reports back that the credential was successfully provided to the application 111 for use (with perhaps an added configured period of elapsed time (such as 30 seconds, etc.)), the credential vault 121 checks the credential back in, which causes the credential vault to invalidate the credential for use with the target application 131 and dynamically and randomly generate a new credential for use by the application 111 when the agent makes a subsequent authorized request on behalf of the application 111.

When the credential vault 121 changes the credential, the credential vault changes the account associated with the credential with the target application 131 using an API to the target application 131.

The above-noted processing illustrates how a hard coded, expired, and invalid credential can bypassed with a randomly generated credential for increasing security in existing applications 111. The existing applications 111 can still operate normally and access the target application 131 and the hard coded credential poses no security risk to the remote server 130 or the target application 131 because it cannot be usurped and provide any access to the remote server 130 or the target application 131. This processing is achieved without any changes to the interfaces or the source code of the existing applications 131. The above-noted processing also illustrates how the existing application 111 can automatically authenticated to the credential vault 121 (through actions of the agent) for purposes of obtaining a current valid credential for authenticating to a target application 131 when that existing application 111 is configured and coded to provide a stale and invalid hard coded credential for accessing that target application 131. This is achieved without logging into the credential vault 121 through the processing information dynamically acquired by the agent from the OS that the existing application 111 processes within.

Figure 1B:
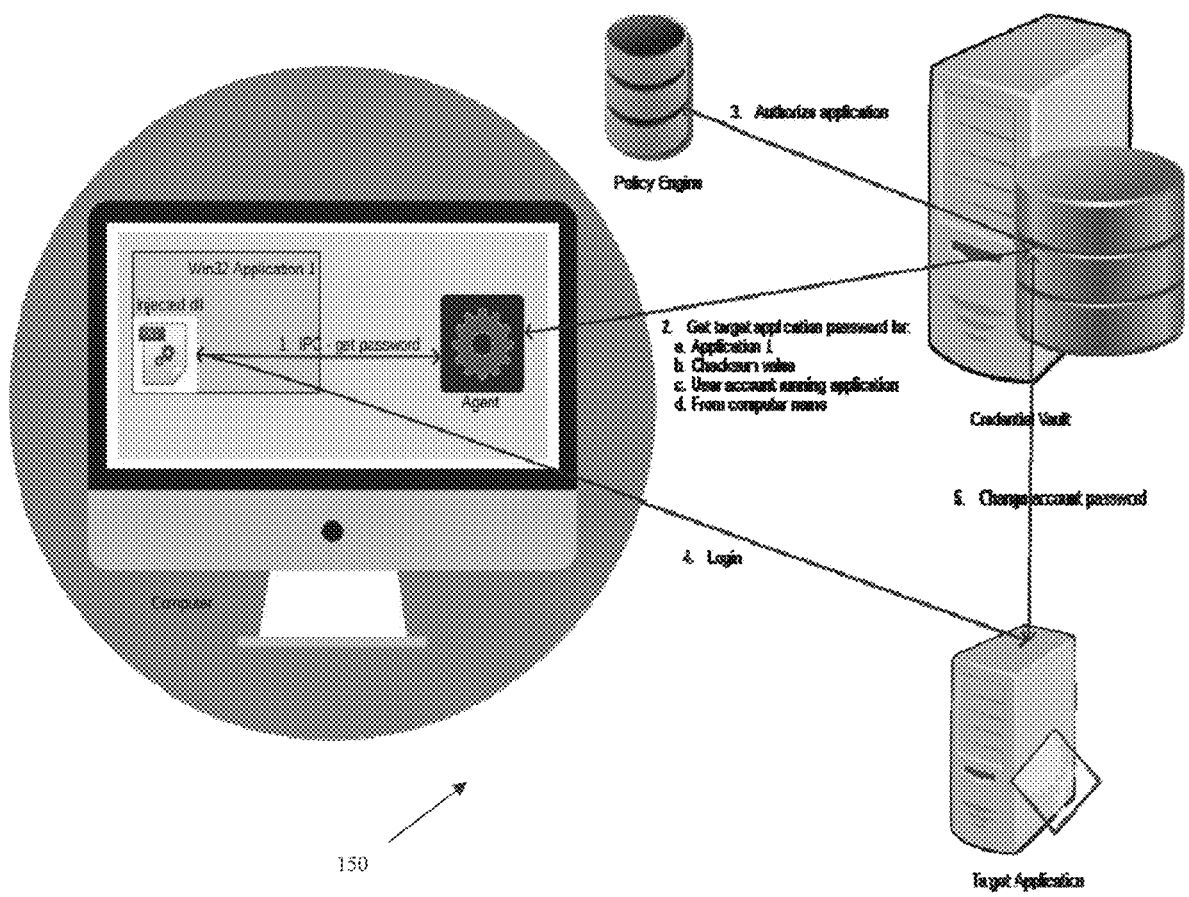
FIG. 1B is a diagram depicting another system for hard coded credential bypassing, according to an example embodiment.

Another processing perspective of the system 100 is now presented with the system 150 of the FIG. 1B.

FIG. 1B is a diagram depicting another system 150 for hard coded credential bypassing, according to an example embodiment.

A client 110 includes an existing application 111 that is a win32 application 1. The win32 application includes a hard coded password for access the target application 131. An Operating System (OS) hook is created through injection of an API 111 using the trampoline function 112.

At 1, the API 113 is configured to interact with an agent to make a request for a password (type of credential).

The API hooking ensures that instead of calling an original internal function of the win32 application, the API hook is called. The API hook interfaces with the agent and when a new randomly generated credential for accessing the target application 131 is provided, process control is passed back to the original internal function of the win32 application. For example, for a database connection SQLDriver-Connect a SQLDriverConnectAPI is called, for a ldap_bind connection a ldap_bindAPI is called, etc.

The dynamic linked library DLL with the hooked API is injected into the OS such that when the win32 application calls the original internal function for accessing the target application 131 the hooked API is called and the hooked API interfaces with the agent.

At 2, the hooked API requests a new credential for the win32 application and provides a variety of OS-obtained information about the win32 application to the credential vault, such as application identifier/name, computed checksum value for the executable of the win32 application, user account running the win32 application, name of the client computer, etc.

The credential vault 121 maintains a pool of accounts for instances of the win32 application (each instance may be associated with a different client computer). The credential vault 121 includes an API for maintaining the accounts with the target application 131 using an existing API provided by the target application 131 for creating and maintaining accounts.

On a credential request from the agent, the credential vault 121 passed the application information associated with the request to the policy engine 141, at 3. Assuming the agent request is authorized by the policy engine 141, one of the maintained credentials for one of the pool of accounts is checked out by the credential vault 121 and locked to ensure that the credential provided to the win 32 application is not provided to any other requesting instances of the win 32 application. The credential (password) is randomly generated and maintained by the credential vault 121. The checkout password is provided from credential vault 121 to the agent, at 2.

The hooked API from the win 32 application automatically calls the agent that processes on the same computer as the win 32 application. This inter-process communication can be achieved using any Inter-Process Communication technology, such as pipes.

The agent is configured to obtain more details about the win 32 application, such as process identifier, process name, checksum of the executable image file for the win 32 application, user account under which the first application is running, and/or the current system name for the processing environment of the computer (client 110).

With this information, the agent (as discussed at 2 above) makes a request or the credential vault 121 for a password (credential) to supply to the win 32 application for accessing the target application 131 using the API hook. In an embodiment, the credential vault 121 is on a separate network computer from the computer that processes the win 32 application. In an embodiment, the credential vault 121 is on the same computer that processes the win 32 application.

The credential vault 121 authorizes the win 32 application (caller) with policies evaluated by the policy engine 141, as discussed at 3 above and using the win 32 application processing information passed as parameters to the credential vault 121, at 2. If authorized, the credential vault 121 checkouts the password for the target application 131 for use by the win 32 application. The credential (password) is passed back to the agent, at 2, and then to the API hook inside and internal to the win 32 application, at 1. The API hook injects the credential (password) into the original function of the win 32 application that calls the target application 131 for access (login), at 4. The win 32 application is able to login, at 4, into the target application 131 with the randomly generated password provided by the credential vault 121 without any coding changes to the win 32 application or any changes to any GUI interface of the win 32 application.

In an embodiment, after a few seconds (such as 30 or any configured period of elapsed time), the agent requests that the credential vault automatically check the password back in. Once the password is checked in, the credential vault 121 changes the password with a new randomly generated password for the associated account on the target application 131, at 5. So, when the password is checked back in, the password is no longer valid for accessing the target application 131.

The original hard coded password in the win 32 application can be expired and changed in the target application 131 and yet because of the processing described, the win 32 application can still login to the target application 131 with a valid password.

Figure 2:
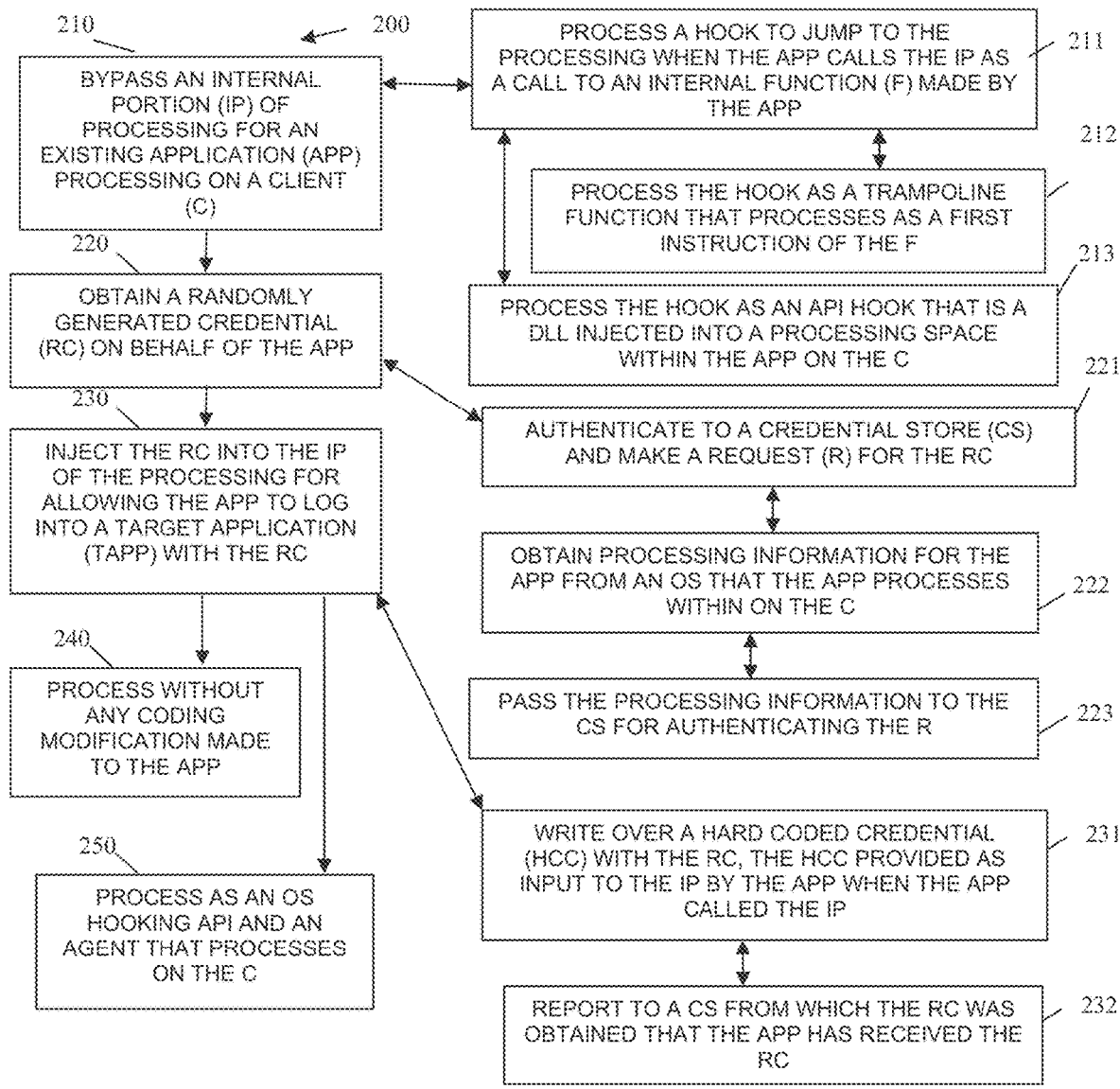
FIG. 2 is a diagram of a method for hard coded credential bypassing, according to an example embodiment.
Figure 3:
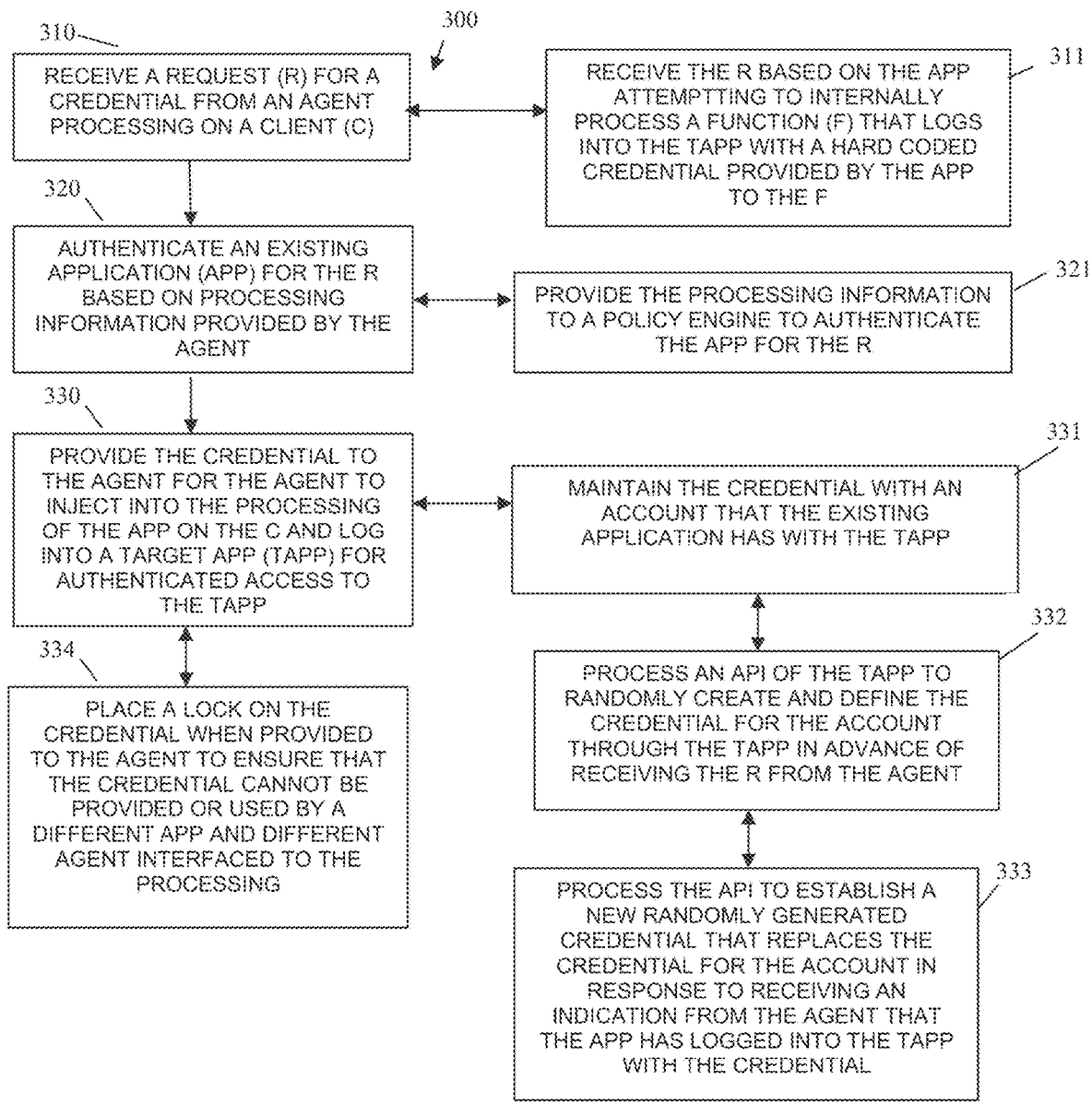
FIG. 3 is a diagram of another method for hard coded credential bypassing according to an example embodiment.
Figure 4:
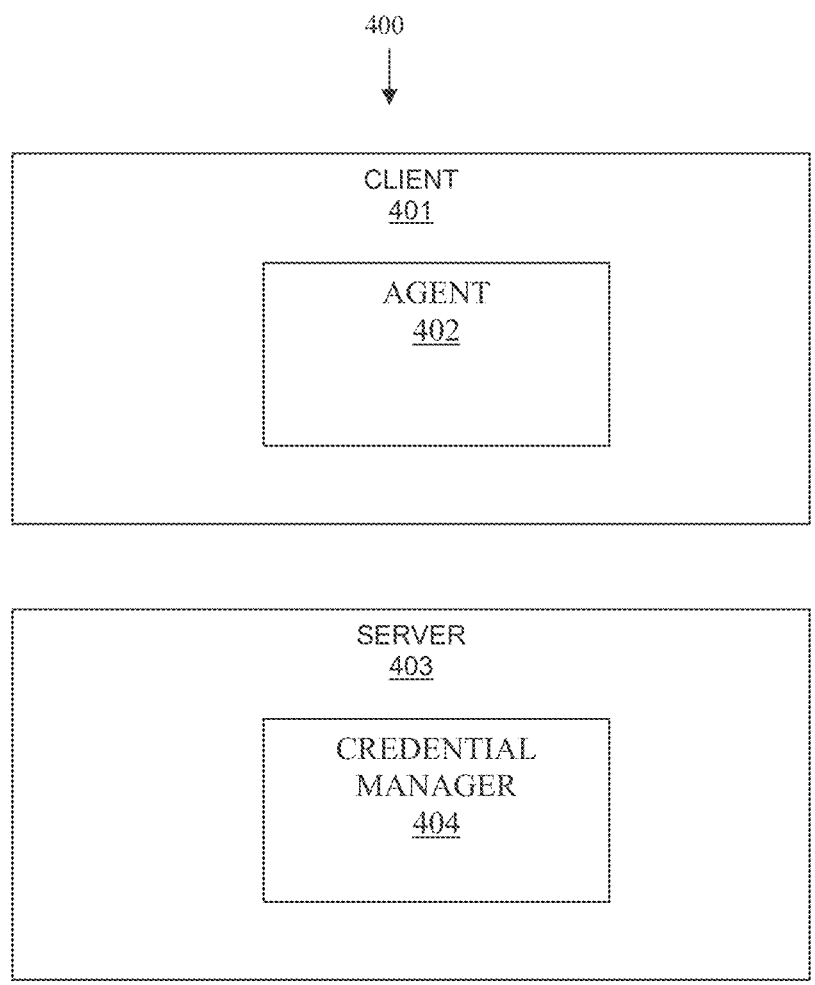
FIG. 4 is a diagram of still another system for hard coded credential bypassing, according to an embodiment.

The embodiments discussed above with the FIGS. 1A-1B are now further discussed as well as other embodiments with the FIGS. 2-4.

FIG. 2 is a diagram of a method 200 for hard coded credential bypassing, according to an example embodiment. The method 200 is implemented as one or more software modules (herein after referred to as a "credential injector"). The credential injector is represented as executable instructions that are implemented, programmed, and resides within memory and/or a non-transitory machine-readable storage media; the executable instructions execute on one or more hardware processors of one or more network devices and have access to one or more network connections associated with one or more networks. The networks may be wired, wireless, or a combination of wired and wireless.

In an embodiment, credential injector is all or some combination of: the trampoline function 112, the API hook, and the agent discussed in the FIGS. 1A-1B.

In an embodiment, the device that executes the credential injector is one of: a server, a cloud, a laptop, a desktop, a wearable processing device, a tablet, a mobile phone, an appliance that is part of the Internet-of-Things (IoTs), a computer integrated into a vehicle, and a Virtual Machine (VM) processing on any hardware device.

At 210, the credential injector bypasses an internal portion of processing for an existing application processing on a client. The credential injector also processing on the client.

According to an embodiment, at 211, the credential injector processes a hook when the existing application calls the internal portion as a call to an internal function that was made by the existing application.

In an embodiment of 211 and at 212, the credential injector processes the hook as a trampoline function that processes as a first instruction of the function. This can be done through a memory pointer on the processing stack and not through any changes to the actual code associated with the function or the existing application, as was described above with the discussions for the FIGS. 1A-1B.

In an embodiment of 211 and at 213, the credential injector processes the OS hook as an API hook that is a DLL injected into the processing space within the existing application on the client. This was described above with the FIG. 1B. For example, assume the target application is a database and the existing application is a win 32 application and the function used by the win 32 application to connect to the database is SQLConnect. A DLL is injected inside the win 32 application becoming a spoofed trampoline, function, called MySQLConnect. This MySQLConnect spoofed function is valid only from inside the win 32 application and not valid and not accessible to any other application that is processing within the OS. When the win 32 application makes the normal call it makes to the SQLConnect function because of the injected DLL, the trampoline function MySQLConnect is called instead (and only for the win 32 application and not for other applications processing within the OS). The MySQLConnect communicates with an agent on the client using Inter Process Call (IPC) mechanisms (like pipes) and requests for a database password for accessing the database (target application) from the credential vault 121. The agent collects the win 32 details, such as checksum for the win 32 application and the user account under which the win 32 application is executing and sends to the credential vault 121. The win 32 application is authorized for requesting the password (credential) based on the win 32 details provided by the agent (verified by the policy engine 141). The credential vault 121 provides back to the agent a short-lived password (credential) that is automatically changed by the credential vault 121 after some period of configured elapsed time from when the password was provided to the agent. At expiration, the credential vault 121 generates a new random password to replace the now expired password and updates the database (target application)) for the account of the win 32 application, such that the password provided to the agent is no longer valid and the new randomly generated and updated password is needed the next time the win 32 application attempts to log into the database (target application), When the credential vault originally returns the password, it is provided to the MySQLConnect, which calls the original function, SQLconnect with the password dynamically acquired from the credential vault 121. MySQLConnect calls the SQLConnect with its original function address (actual pointer) with some offset value (a point from which the SQLConnect process can continue as it normally would but with the dynamically acquired password).

At 220, the credential injector obtains a randomly generated credential on behalf of the existing application.

According to an embodiment, at 221, the credential injector authenticates to a credential store (also referred to herein as the credential vault 121 described with the FIGS. 1A-1B above). The credential injector makes a request to the credential store for the randomly generated credential.

In an embodiment of 221 and at 222, the credential injector obtains processing information for the existing application from an OS that the existing application processes within on the client. The types of processing information were discussed above with the FIGS. 1A-1B.

In an embodiment of 222 and at 223, the credential injector passes the processing information to the credential store for authentication the request made for the randomly generated credential (at 221).

At 230, the credential injector injects the randomly generated credential into the internal portion of the processing of the existing application for allowing the existing application to log into a target application with the randomly generated credential (which is a valid credential recognized by the target application for accessing the target application).

In an embodiment, at 231, the credential injector writes over a hard coded credential with the randomly generated credential. The hard coded credential provided as input to the internal portion of the existing application by the existing application when the existing application initially attempted to call the internal portion for accessing the target application.

In an embodiment of 231 and at 232, the credential injector reports to a credential store from which the randomly generated credential was obtained that the existing application has received the randomly generated credential (as described above and below, this permits the credential store to change the randomly generated credential to a new credential with the target application for added security).

According to an embodiment, at 240, the credential injector processes without any coding modifications or interfaces changes made to the existing application.

In an embodiment, at 250, the credential injector processes as an OS hooking API and an agent that process on the client. In an embodiment, the OSH hooking API and agent are described above in the description of the FIGS. 1A-1B.

FIG. 3 is a diagram of another method 300 for hard coded credential bypassing, according to an example embodiment. The method 300 is implemented as one or more software module(s) (herein after referred to as a "credential vault credential bypass manager") on one or more hardware devices. The credential vault credential bypass manager is represented as executable instructions that are implemented, programmed, and resides within memory and/or a non-transitory machine-readable storage medium; the executable instructions execute on one or more hardware processors of the one or more hardware devices and have access to one or more network connections associated with one or more networks. The networks may be wired, wireless, or a combination of wired and wireless.

In an embodiment, the credential vault credential bypass manager is all or some combination of the credential vault 121 and the policy engine 141 discussed above with the FIGS. 1A-1B.

The credential vault credential bypass manager interacts with the client device that processes the credential injector (method 200) for bypassing hard coded credentials in an existing (legacy) application that executes on the client device.

In an embodiment, the device that processes the credential vault credential bypass manager is the credential server 120.

In an embodiment, the device that processes the credential vault credential bypass manager is a cloud or cloud processing environment.

At 310, the credential vault credential bypass manager receives a request for a credential from an agent processing on a client.

In an embodiment, the credential vault credential bypass manager processes on a different network-enabled device from the client.

In an embodiment, the credential vault credential bypass manager processes within a different VM from a VM that processes the agent with both VMs executing and layered on the client.

In an embodiment, at 311, the credential vault credential bypass manager receives the request based on the existing application attempting to internally process a function that logs into a target application (over a network connection) with a hard coded credential provided by the existing application to the internal function.

At 320, the credential vault credential bypass manager authenticates the existing application for the request based on processing information for the existing application as provided by the agent.

In an embodiment, the processing information is provided by the agent with the request.

In an embodiment, the credential vault credential bypass manager makes a request of the agent to provide the processing information following receipt of the request from the agent.

In an embodiment, at 321, the credential vault credential bypass manager provides the processing information to a policy engine to authenticate the existing application for the request. In an embodiment, the policy engine is the policy engine 141.

At 330, the credential vault credential bypass manager provides the credential to the agent for the agent to inject into the processing of the existing application on the client and log into the target application for authenticated access to the target application.

In an embodiment, at 331, the credential vault credential bypass manager maintains the credential with an account that the existing application has with the target application.

In an embodiment of 331 and at 332, the credential vault credential bypass manager processes an API of the target application to randomly create and define the credential for the account through the target application in advance of receiving the request from the agent.

In an embodiment of 332 and at 333, the credential vault credential bypass manager processes the API to establish a new randomly generated credential that replaces the credential in response to receiving an indication from the agent that the existing application has successfully logged into the target application with the provided credential.

In an embodiment, the credential vault credential bypass manager maintains accounts and credentials for multiple different existing applications and agents that processing on multiple network clients, each different existing application having a unique account with the target application that the credential vault credential bypass manager manages in the manners discussed herein.

In an embodiment, at 334, the credential vault credential bypass manager places a lock or a hold on the credential when the credential is provided to the agent to ensure that the credential cannot be provided or used by a different existing application and different agents interfaced to the credential vault credential bypass manager from different clients.

FIG. 4 is a diagram of still another system 400 for hard coded credential bypassing, according to an embodiment. Various components of the multi-factor authentication system 400 are software module(s) represented as executable instructions, which are programed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the system 400 implements, inter alia, the processing depicted in the FIGS. 1A-1B and the FIGS. 2-3. Accordingly, embodiments discussed above with respect to the FIGS. 1A-1B and 2-3, presented herein and above, are incorporated by reference herein with the discussion of the system 400.

The system 400 includes a client device 401 having an agent 402 and a server 403 having a credential manager 404.

In an embodiment, the client device 401 is one of: a desktop computer, a laptop computer, a wearable processing device, a tablet computer, a mobile phone, an appliance part of the IoTs, and a computer integrated into a vehicle.

In an embodiment, the agent 402 is all or some combination of the trampoline function 112, the API 113, and the agent discussed above with reference to the FIGS. 1A-1B.

In an embodiment, the agent 401 is the method 200 of the FIG. 2.

In an embodiment, the server 403 is the credential server 120.

In an embodiment, the server 403 is part of a cloud environment.

In an embodiment, the credential manager 404 is all or some combination of the credential vault 121 and the policy engine 141.

In an embodiment, the credential manager 404 is the method 300.

The agent 402 is configured to: 1) execute on at least one hardware processor of the client 401, 2) bypass an internal login process of an existing application when the existing application attempts to log into a target application with a hard coded credential, 3) interact with the credential manager 404 to obtain a replacement credential, and 4) replace the hard coded credential with the replacement credential and process the internal login process of the existing application.

The credential manager 404 is configured to: 1) execute on at least one hardware processor of the server 403, 2) interact with the agent 402 to authenticate the existing application for the replacement credential, 3) provide the replacement credential to the agent 402, and 4) manage an account that the existing application has with the target application to define the replacement credential and to change the replacement credential.

In an embodiment, the credential manager 404 is further configured to interact with a policy engine to authenticate the existing application for the replacement credential based on processing information for the existing application provided by the agent 402.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method for bypassing hard coded credentials, comprising:

bypassing an internal portion of processing for an existing application processing on a client by replacing an addresses in memory associated with an internal function call made by the internal portion of the existing application with a different address associated with the method,
wherein the internal function is a call made by the existing application to a target application for authenticating the existing application to the target application for access;
obtaining a randomly generated credential on behalf of the existing application by at least computing a checksum value for the existing application,
authenticating the existing application based on the checksum value, and
obtaining the randomly generated credential for the existing application based on the authenticating;
injecting the randomly generated credential into the internal portion of the processing by replacing a credential generated by the existing application with the randomly generated credential and calling the address in memory of the internal function with the randomly generated credential causing the internal function of the existing application to call the target application and log the existing application into the target application using the randomly generated credential instead of the credential; and processing the method without any coding modifications made to the existing application.

2. The method of claim 1, wherein bypassing further includes processing a hook to jump to the method processing when the existing application calls the internal portion as a call to the internal function made by the existing application.

3. The method of claim 2, wherein processing further includes processing the hook as a trampoline function that processes as a first instruction of the internal function.

4. The method of claim 2, wherein processing further includes processing the hook as an Application Programming Interface (API) hook that is a dynamically linked library injected into a processing space within the existing application on the client.

5. The method of claim 1, wherein obtaining further includes authenticating to a credential store and making a request for the randomly generated credential.

6. The method of claim 5, wherein authenticating further includes obtaining processing information for the existing application from an Operating System (OS) that the existing application processes within on the client.

7. The method of claim 6, wherein obtaining further includes passing the processing information to the credential store for authenticating the request.

8. The method of claim 1, wherein injecting further includes writing over a hard coded credential representing the credential with the randomly generated credential, wherein the hard coded credential provided as input to the internal portion by the existing application when the existing application called the internal portion.

9. The method of claim 8, wherein writing further includes reporting to a credential store from which the randomly generated credential was obtained that the existing application has received the randomly generated credential.

10. The method of claim 1 further comprising, processing the method as an Operating System (OS) hooking Application Programming Interface (API) and an agent that process on the client.

11. A method for bypassing hard coded credentials, comprising: receiving a request for a credential from an agent processing on a client,
wherein the agent is processed when an internal portion of an existing application calls a memory address associated with an internal function of the existing application and the internal function calls a target application with an application-generated credential produced by the existing application;
obtaining a randomly generated credential on behalf of the existing application by at least computing a checksum value for the existing application,
authenticating the request made by the existing application based on processing information comprising at least the checksum value computed by the agent for the existing application and provided by the agent;
provide the credential to the agent for the agent to inject into the internal portion by replacing the application-generated credential with the credential and calling the memory address to invoke the internal function,
causing the internal function to call the target application and log the existing application into the target application with the credential for authenticated access to the target application; and processing the method without any coding modifications made to the existing application.

12. The method of claim 11, wherein receiving further includes receiving the request based on the existing application attempting to internally process the internal function that logs into the target application with a hard coded credential provided by the existing application to the function as the application-generated credential.

13. The method of claim 11, wherein authenticating further includes providing the processing information to a policy engine to authenticate the existing application for the request.

14. The method of claim 11, wherein providing further includes maintaining the credential with an account that the existing application has with the target application.

15. The method of claim 14, wherein maintaining further includes processing an Application Programming Interface (API) of the target application to randomly create and define the credential for the account through the target application in advance of receiving the request from the agent.

16. The method of claim 15, wherein processing further includes processing the API to establish a new randomly generated credential that replaces the credential for the account in response to receiving an indication from the agent that the existing application has logged into the target application with the credential thereby invaliding the credential for access to the target application a next time that the existing application attempts to log into the target application.

17. The method of claim 11, wherein injecting further includes placing a lock on the credential when provided to the agent ensuring that the credential cannot be provided or used by a different existing application and different agent interfaced to the method.

18. A system for bypassing hard coded credentials, comprising:
a server configured with a credential manager;
wherein the credential manager is configured to:
a) execute on at least one hardware processor of the server,
b) interact with an agent of a client to authenticate an existing application of the client for a randomly generated replacement credential to an original hardcoded credential of the existing application by using at least a checksum value computed for the existing application by the agent,
c) provide the replacement credential to the agent to replace the original hardcoded credential with the replacement credential within memory for an executing version of the existing application and without any coding modifications to the existing application for the executing version of the existing application to authenticate to a target application, and d) manage an account that the existing application has with the target application to define the replacement credential and to change the replacement credential.

19. The system of claim 18, wherein the credential manager is further configured, in b), to: 1) provide processing information for the existing application to a policy engine that evaluates policies in view of the processing information and 2) receive an authorization back from the policy engine indicating that the existing application is to receive the replacement credential based on the processing information.

* * * * *